(No Model.)
P. F. SMITH.
METHOD OF CONVERTING FLOUR INTO DOUGH.
No. 332,018. Patented Dec. 8, 1885.
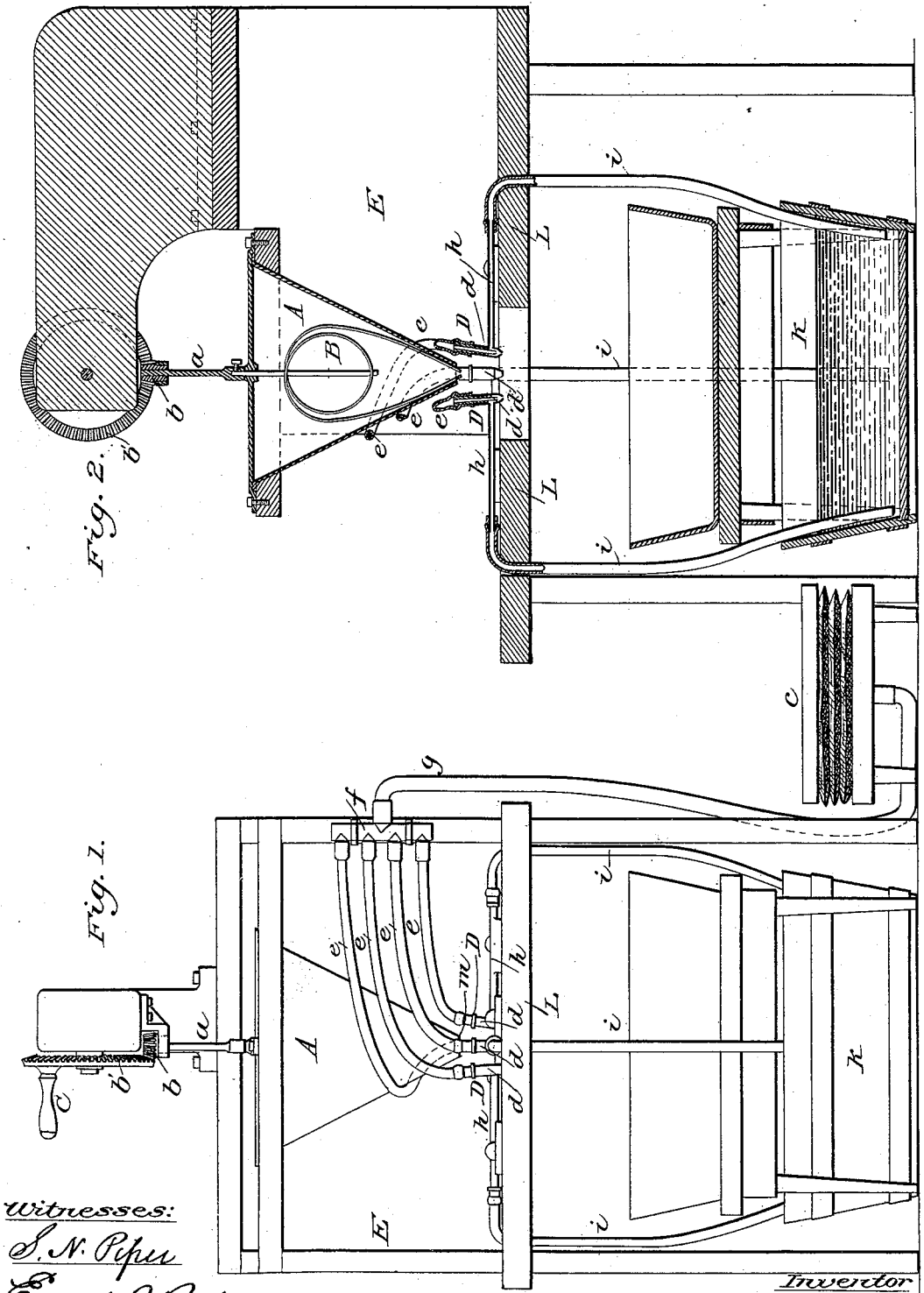
Witnesses:
S. N. Piper
Ernest B. Pratt
Inventor
Perry F. Smith
by R. H. Eddy, atty.

UNITED STATES PATENT OFFICE.

PERRY FIFIELD SMITH, OF BOSTON, MASSACHUSETTS.

METHOD OF CONVERTING FLOUR INTO DOUGH.

SPECIFICATION forming part of Letters Patent No. 332,018, dated December 8, 1885.

Application filed May 20, 1885. Serial No. 166,207. (No specimens.)

*To all whom it may concern:*

Be it known that I, PERRY FIFIELD SMITH, of Boston, in the county of Suffolk, of the Commonwealth of Massachusetts, have invented a new and useful Method or Process of Converting Flour into Dough; and I do hereby declare the same and mechanism for converting it to be described in the following specification and represented in the accompanying drawings, of which—

Figure 1 is a front elevation, and Fig. 2 a longitudinal section, of such mechanism, the nature of my invention being defined in the claim hereinafter presented.

By my mode or process of treating flour a mass of it is to be beaten or stirred so as to separate its particles from one another, and while they are so separated they are subjected to the action of air and vapor in a manner to cause them, when falling or coming again together, to form a spongy mass of dough.

In the drawings, A denotes a hopper having within it a rotary agitator or stirrer, B, having on its shaft $a$ a bevel-pinion, $b$, to engage with a bevel-gear, $b'$, suitably supported and furnished with a crank, $c$, for revolving it. Below the educt $m$ of the hopper are four or other suitable number of atomizers, D, whose air-vents $d$ have tubes $e$ extending from them to and opening into a single tube, $f$, closed at its ends, and at its middle opening into the eduction-pipe $g$ of a bellows, C. Each of such vents is fixed to the end of and opens into a jet-tube, $h$, from which an induct or tube, $i$, leads into a tub or reservoir, $k$, containing water. The atomizers are supported on the base L of a frame, E, that supports the hopper and the mechanism for operating the agitator therein.

In using the said machine the hopper is to be charged with flour, or flour is to be allowed to fall into it, and having been stirred by the agitator it is to be discharged from the hopper in a stream between the vents $d$ of the atomizers. The particles of flour, in passing or falling in a divided state between the atomizers, will by them be subjected to the action of currents of air and spray discharged from their vents directly upon such particles, such currents passing downward into and with the descending particles, which in their fall will be wet or moistened by the spray, and in coming together upon a platform, or in a suitable receptacle, will form a spongy mass, or be converted into dough, fit for being baked for conversion into bread.

I do not herein claim the mechanism herein described for making dough by my said process, it being the subject of another application for a patent now pending before the Patent Office and made by me; but

I claim—

The mode or process, substantially as described, of treating flour for converting it into a spongy mass or dough, such consisting in forcibly separating the particles asunder and causing them, in a divided state or cloud, to pass or fall through the air, and while so passing or falling discharging upon them air and vapor or spray in a manner to moisten them and cause them when coming or falling together to adhere to each other and the mass to be permeated with air.

PERRY FIFIELD SMITH.

Witnesses:
R. H. EDDY,
ERNEST B. PRATT.